United States Patent [19]
Orndorff, Jr.

[11] 3,932,004
[45] Jan. 13, 1976

[54] RUBBER BEARING WITH NON-METALLIC SUPPORT MEMBER

[75] Inventor: Roy L. Orndorff, Jr., Kent, Ohio

[73] Assignee: The B. F. Goodrich Company, Akron, Ohio

[22] Filed: Feb. 6, 1975

[21] Appl. No.: 547,586

[52] U.S. Cl. .......................... 308/238; 308/DIG. 8
[51] Int. Cl.² .................................... F16C 33/20
[58] Field of Search .............. 308/237 R, 238, 240, DIG. 12, 308/DIG. 8; 252/12, 12.2, 12.4, 12.6, 49.3; 184/1 E

[56] References Cited
UNITED STATES PATENTS

| | | | |
|---|---|---|---|
| 3,637,273 | 1/1972 | Orndorff | 308/238 |
| 3,724,919 | 4/1973 | Lagally et al. | 308/238 |
| 3,864,197 | 2/1975 | Shobert | 308/238 X |

Primary Examiner—M. H. Wood, Jr.
Assistant Examiner—Gene A. Church
Attorney, Agent, or Firm—Harry F. Pepper, Jr.

[57] ABSTRACT

A liquid-lubricated rubber bearing having a bearing member composed of resilient elastomeric bearing portions separated by longitudinal grooves is supported by rigid, non-metallic, composite backing structure of non-corrosive, non-shrinkable, non-conductive fibrous material embedded in a vulcanized synthetic rubber matrix. The fibrous material component is preferably one or more square-woven sheets of glass cords or strands. The composite backing can be a unitary cylindrical shell or, in the case of "segmental" type rubber bearings, a series of elongated strips to support the structurally separate or "segmented" bearing portions.

7 Claims, 4 Drawing Figures

RUBBER BEARING WITH NON-METALLIC SUPPORT MEMBER

BACKGROUND OF THE INVENTION

The invention relates to elastomeric bearings which are lubricated by liquids, such as water, and particularly to such bearings which utilize resilient elastomeric bearing portions secured to a rigid, non-metallic, support member.

Liquid-lubricated elastomeric bearings are well-known in the art, particularly in the marine field. Generally, these bearings provide resilient elastomeric bearing portions capable of being lubricated by a particular liquid, such as water. The bearing portions are typically backed by a rigid, non-corrosive, support member. Traditionally, these support members have been of a metal selected principally for its ability to resist corrosion by the liquid with which the bearing comes in contact when in use. In marine use, for example, water-lubricated elastomeric bearing surfaces are typically secured to a bronze, brass, or stainless steel support or backing member.

More recently, there has been increased interest in constructing the support or backing members for such bearings of non-metallic material principally because of the increasing costs involved in the continued use of the non-corrosive type metal supports. In addition, it has been demonstrated that many of the support member metals permit or even enhance undesirable electrolytic action to take place in certain liquid environments, such as sea water. This electrolytic action can detrimentally affect not only the bearing itself, but the structure in which the bearing is being used.

The most popular non-metallic materials currently being proposed for use as a marine bearing backing or support, are structures of thermosetting plastics. These materials are molded or otherwise formed to the shape desired and may include added reinforcement and/or inert fillers. Examples of such proposed structures are disclosed in U.S. Pat. Nos. 3,023,059 and 3,455,619.

By careful selection of particular types of plastic material and/or reinforcement, fillers, etc., a backing or support structure can be made which exhibits adequate structural stiffness and strength to resist the forces to which it may be subjected in use, sufficient resistance to any deleterious effect arising from contact with various liquids, and low water absorption and swell characteristics. Also, these plastic members can be made to maintain sufficient stiffness and strength when heated, a necessary characteristic when using several of the typical methods used in manufacturing elastomeric bearings. In a typical fabrication process, the unvulcanized or "raw" rubber mixture or compound which ultimately forms the bearing portion is molded and cured while disposed against its rigid backing or support structure. Thus, the backing structure employed must not soften or otherwise decompose when subjected to the heat and pressure necessary to vulcanize and mold the bearing portion or portions.

There are, however, certain disadvantages in plastic and/or reinforced plastic structures used for this purpose. The impact strength normally exhibited by these plastic structures is less than satisfactory in many cases. Also, occasional failures of these plastic supports have been observed to be quite catastrophic in nature, thus risking damage to the surrounding structures in which they are housed. Additional cutting and machining of these supports, an operation often necessary in finally finishing the bearings, is sometimes difficult and has caused damage to the cutting and machining tools used.

Also, as in the case of metallic support or backing members, it is usually necessary that these plastic supports be "custom" fabricated in their final configuration in an inventory of various sizes to await final molding and curing of an elastomeric bearing member thereto. This obviously can cause inventory, storage and spatial problems to a manufacturer.

SUMMARY

It is an object of the present invention to provide an elastomeric bearing with rigid, non-metallic support or backing structure which is relatively inexpensive, strong, stiff and easily machined and/or cut.

It is another object to provide an elastomeric bearing with a rigid, non-metallic support member, which will not corrode, permit or enhance electrolytic action, nor fail in a catastrophic manner.

It is still another object of the present invention to provide an elastomeric bearing with a rigid non-metallic backing or support of easily processed, high impact strength material which has sufficient "hot" strength and stiffness so as to permit its use in most elastomeric bearing manufacturing operations.

These and other objects, which will be more evident from the detailed description which follows, are achieved by an elastomeric bearing in which the resilient elastomeric bearing portions are secured to a rigid, non-metallic, backing or support which is a composite structure consisting essentially of a fibrous component embedded in and distributed evenly throughout a vulcanized synthetic rubber component. The fibrous component material is preferably glass and more preferably is in the form of one or more adjacent sheets or layers of square-woven glass fabric. The composite structure according to the invention can be formed as a unitary cylindrical shell-like member, or, in the case of segmental bearings, as a plurality of elongated bearing portion support strips.

THE DRAWINGS

The invention according to its preferred embodiments is represented in the accompanying drawings in which.

PRESENTLY PREFERRED EMBODIMENTS

The invention according to presently preferred embodiments will be described with reference to the accompanying drawings and also with emphasis upon application to marine type elatomeric bearings. It is understood, however, that the invention has application to other elastomeric bearing designs and is also useable in such bearings utilized in liquid environments other than water.

Figure 1:
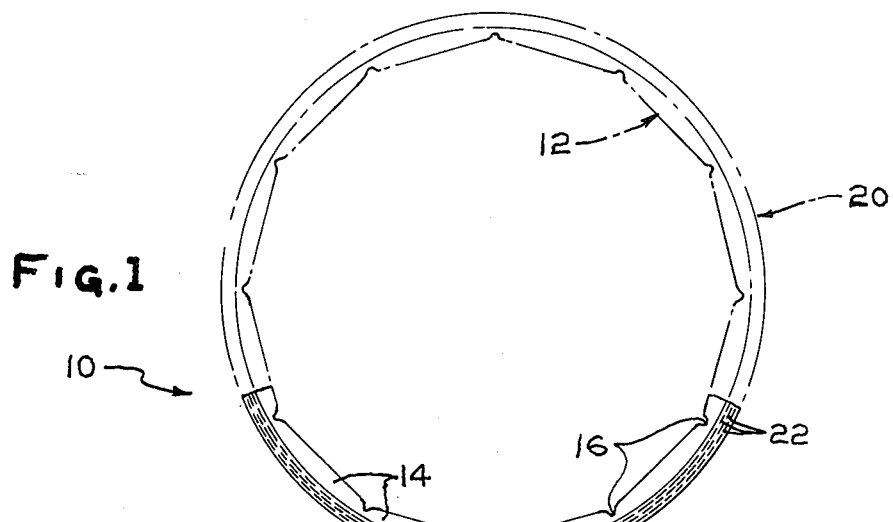
FIG. 1 is a view along the axis of one type of elastomeric bearing incorporating the present invention, with portions thereof broken away and shown in section.

In FIG. 1, a cylindrical, water-lubricated, elastomeric bearing 10 is shown generally of the type suitable for use on typical marine craft, such as boats or the like, and which is adapted to journey a rotating shaft (not shown). The bearing 10 comprises an inner, molded, resilient vulcanized elastomeric annulus 12 which includes annularly spaced bearing portions 14 upon which a rotatable shaft is to bear. The annulus 12 also includes a plurality of radially outwardly recessed grooves 16 between the bearing portions 14 to permit passage of water and/or water suspended solids through the bearing. The grooves 16 preferably extend longitudinally of the bearing in a direction substantially parallel to the axis thereof. The bearing 10 further includes an outer, rigid, cylindrical shell 20 to which the resilient elastomeric annulus 12 is securely attached as, for example, by bonding. The rigid shell 20, according to the present invention, is a composite, non-metallic structure consisting essentially of a fibrous component in the form of a plurality of annularly disposed, radially adjacent fabric layers 22 uniformly disposed throughout and embedded within a vulcanized, synthetic rubber compound component 24.

Figure 3:
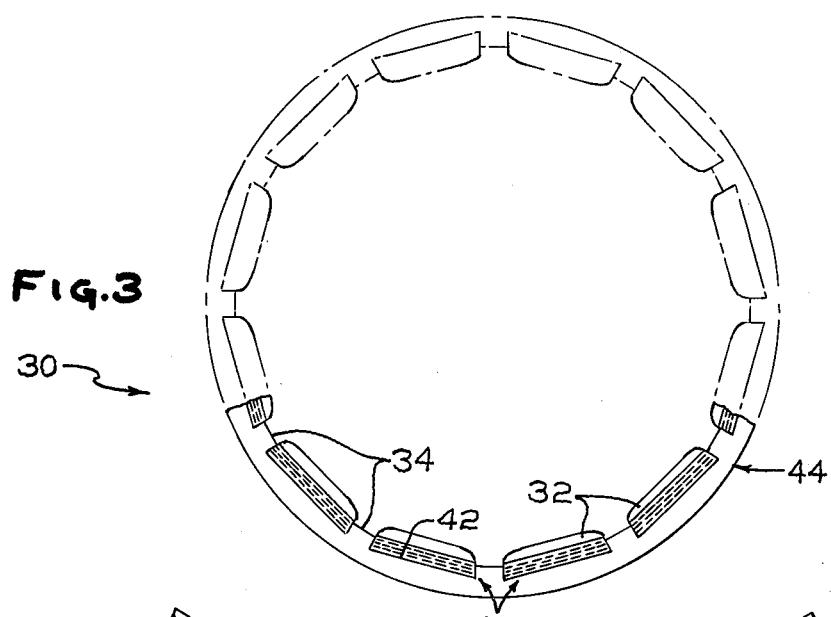
FIG. 3 is a view along the axis of another type of elastomeric bearing incorporating the present invention, with portions thereof broken away and shown in section.
Figure 4:
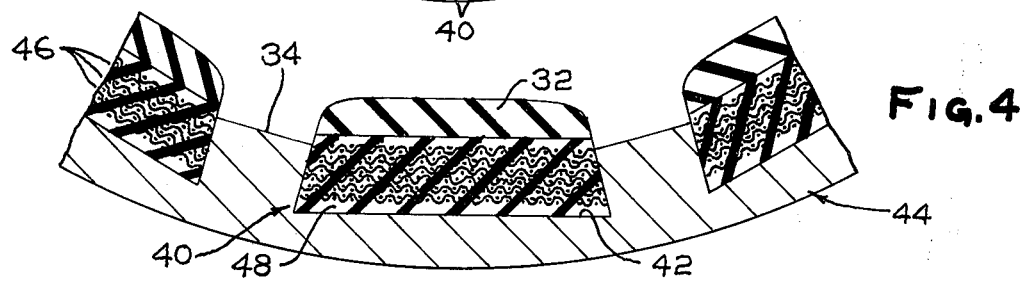
FIG. 4 is an enlarged arcuate portion of the FIG. 3 bearing with portions thereof in section.

In FIGS. 3 and 4, a segmental type elastomeric bearing 30 is shown which comprises an annularly spaced plurality of resilient, elastomeric bearing portion segments 32, each secured to a rigid backing member or strip 40. The segments 32 with backing strips 40 are secured to a cylindrical support shell 44 in suitable fashion as by dovetail slots 42 formed in cylindrical support shell 44. Water and/or water suspended solids can pass through bearing 30 along the longitudinal passage ways 34 between bearing portions 32. This segmental style construction is popular when using elastomeric bearings of relatively large diameter.

Figure 2:
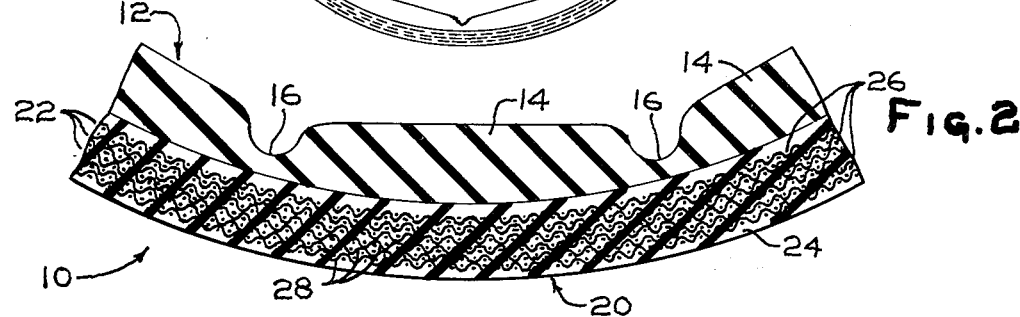
FIG. 2 is an enlarged arcuate portion of the bearing shown in FIG. 1 with portions thereof shown in section.

The support strips 40 are, according to the present invention, of composite, non-metallic construction similar to the construction of cylindrical member 20 shown in FIGS. 1 and 2. Thus, as more clearly seen in FIG. 4, each strip 40 consists essentially of a fibrous component in the form of a plurality of radially adjacent fabric sheets or layers 46 uniformly disposed throughout and embedded within a vulcanized, synthetic rubber compound component 48.

It is to be understood that this invention can be embodied in other types of segmental bearings than the specific type shown in FIGS. 3 and 4. For example, a popular alternate type segmental bearing to that shown is one in which the strip-backed segments are not held in annularly spaced slots or grooves formed in a cylindrical support shell but are tightly fitted around a smooth shell such that the longitudinal edges of a given segments are contiguous with a longitudinal edge of an adjacent segment. The support strips used in this alternate type of segmental bearing can also be designed in accordance with the present invention.

The elastomeric bearing material (e.g. the annulus 12 or segment 32 material) is typically a vulcanized rubber composition which will exhibit a low coefficient of friction when lubricated by water, in the case of marine type bearings, or by other liquids, in case of lubrication by liquids other than water and will not be damaged by such liquids. The elastomeric material should be of adequate resiliency, yet have sufficient strength and heat resistance to withstand temporary operation out of the presence of lubricating liquid, such as startup, for example. Excellent composition candidates for this purpose are various conventional nitrile rubber compositions, particularly compositions comprising polymers of butadiene and acrylonitrile where butadiene is the major component of the polymer, Also, natural and other synthetic rubber compositions are possible provided they have the properties previously mentioned.

Each fibrous layer 22 in FIG. 1 or 46 in FIG. 2 is preferably a square-woven pattern of cords or strands (hereinafter to be referred to only as "cords" with the understanding that the term "cords" includes cords, strands and/or other thread like forms known in the art) of a particular fiber material which will not corrode and/or shrink when exposed to water and will not conduct electricity. The cords are also preferably of a relatively high modulus material thereby contributing effectively to the overall stiffness and/or rigidity of shell 20 or strip 40. Glass has been found to be an excellent material for layers 22 or 46. A square-woven pattern for these layers is preferred to provide both longitudinal strength (e.g. by warp cords 26 of each sheet 22) and radial strength (e.g. by weft or pick cords 28) to the composite structure. If desired, sheets or layers of cords arranged in other than square-woven patterns may be employed, although it is preferred that in such arrangements, the pattern at least includes cords extending in a longitudinal direction (i.e. substantially parallel to the bearing axis).

The layers 22 or 46 of fibrous material can also be short, chopped cords, if desired. These short cords, in each layer can be oriented in a pre-selected direction or can be randomly arranged, as long as a relatively uniform distribution is maintained throughout the rubber compound matrix in which they are disposed. Also, various combinations of short, chopped cords with sheet like patterns of cords are possible for fibrous components of the composite shell or strip.

The matrices 24 or 48 are of a vulcanized synthetic rubber compound selected for its capability to demonstrate certain properties. The compound should, when vulcanized satisfactorily, adhere or even impregnate the cord material used in sheets or layers 22 or 46, and be capable of being bonded or otherwise secured to the material comprising resilient, elastomeric annulus 12 or segments 32. The vulcanized compound selected for matrix 24 should have excellent heat resistance, particularly when the resilient elastomeric bearing material is to be molded and vulcanized against it. Various compositions of nitrile rubbers, particularly, those comprising butadiene-acrylonitrile polymers wherein butadiene is the major polymer component, have been found very satisfactory for this purpose. Also, certain compounds of neoprene are possible. Generally, however, compositions of natural rubber are not adequate due to their unsatisfactory resistance to high heats.

As stated, it is preferred that the fibrous layers 22 or 46 be sheets of cords in a square-woven pattern. In the embodiments according to the drawings, six such layers are shown, a number found suitable for most small and intermediate size bearings (e.g. up to about 6 inches [152.4mm] in outside diameter). In larger bearings (e.g. greater than about 6 inches [152.4mm] in outside diameter) particularly those which are not of the segmented type shown in FIGS. 3 and 4, it may be desirable to use a supporting or backing structure including more than six adjacent fabric layers for added strength and stiffness.

As indicated previously, an important advantage to using shells, such as 20, or strips such as 40 in accordance with the present invention is relative ease of fabrication to various required specification. More specifically, these composite supports can be adapted for fabrication in several relatively independent stages, thus alleviating certain inventory, storage and spatial problems confronting manufacturers using certain of the more conventional or traditional metallic or thermoplastic supports.

For example, one way to fabricate the composite supports shown in the drawing is to form a laminate of three sheets of square-woven glass cords in which the inner or middle sheet has been dipped, sprayed or otherwise coated on both sides with a suitable vulcanizable synthetic rubber compound. This flat laminate can then be vulcanized leaving the exposed sides of the outer sheets essentially bare or non-rubberized. These laminates may be stored or inventoried in this condition until needed as a support or backing material for a particular bearing.

The exposed or uncovered sides may then be dipped, sprayed or otherwise coated with a suitable vulcanizable synthetic rubber composition and rolled into a tube the wall of which being basically two thicknesses of the three sheet laminate. When forming the tube, the edges of the laminate extending longitudinally of the tube are preferably adjacent each other. Thus, a tube is formed having basically six layers of square-woven glass sheet.

The rolled tube may be put in a bearing mold and completely vulcanized with molding and vulcanization of the resilient elastomeric bearing portions to the tube. The first vulcanization of the partially rubberized flat laminate mentioned previously assures that the rolled tube will withstand the pressures and heat to which it is subject during this second or final molding and vulcanization step. If desired, however, the rolled, partially rubberized tube may be fully rubberized and completely vulcanized prior to its insertion into the bearing forming mold.

It is clear that similar laminating and casting procedures could be used to make strips 40 without the necessity of rolling the sheets into tubes.

It is understood that the immediately preceding fabrication procedures described are for purposes of a more complete understanding of the invention and that there are various procedures possible for fabricating the composite supporting or backing structures according to this invention.

The foregoing describes the invention in accordance with several preferred embodiments. It is evident that various modifications to such embodiments are possible and that such modifications are to be considered in light of the scope of the appended claims.

What is claimed is:

1. In a generally cylindrical water-lubricated bearing comprising a plurality of bearing portions of resilient elastomeric material separated by longitudinally extending lubricant passages, each bearing portion secured to a rigid non-metallic supporting member, the improvement wherein said non-metallic supporting member is a composite structure consisting essentially of a non-corrosive, non-shrinkable, non-conductive fibrous component embedded in and distributed substantially evenly throughout a vulcanized synthetic rubber component.

2. The invention as defined in claim 1 wherein said fibrous component is glass.

3. The invention defined in claim 1 wherein said fibrous component comprises a plurality of cords extending substantially parallel to the longitudinal axis of said bearing.

4. The invention as defined in claim 3 wherein said cords are glass.

5. The invention defined in claim 1 wherein said fibrous component comprises at least one square-woven fabric sheet.

6. The invention defined in claim 5 wherein said square-woven fabric sheet is glass.

7. The invention of claim 1 wherein said fibrous component comprises radially adjacent layers of square-woven fabric.

* * * * *